Oct. 27, 1931. J. T. ASHTON 1,829,388
ONE-MAN CONTROLLED COMBINED HARVESTER AND THRASHER
Filed Nov. 9, 1927 2 Sheets-Sheet 2
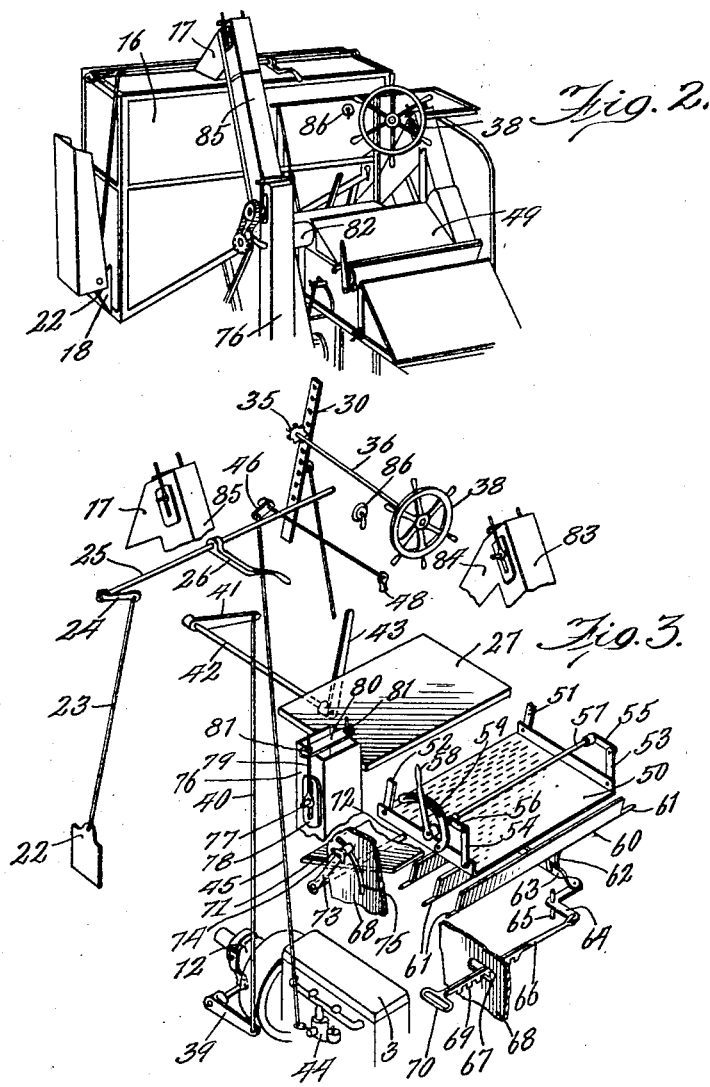
Inventor:
James T. Ashton
By Wallace R. Lane,
Atty.

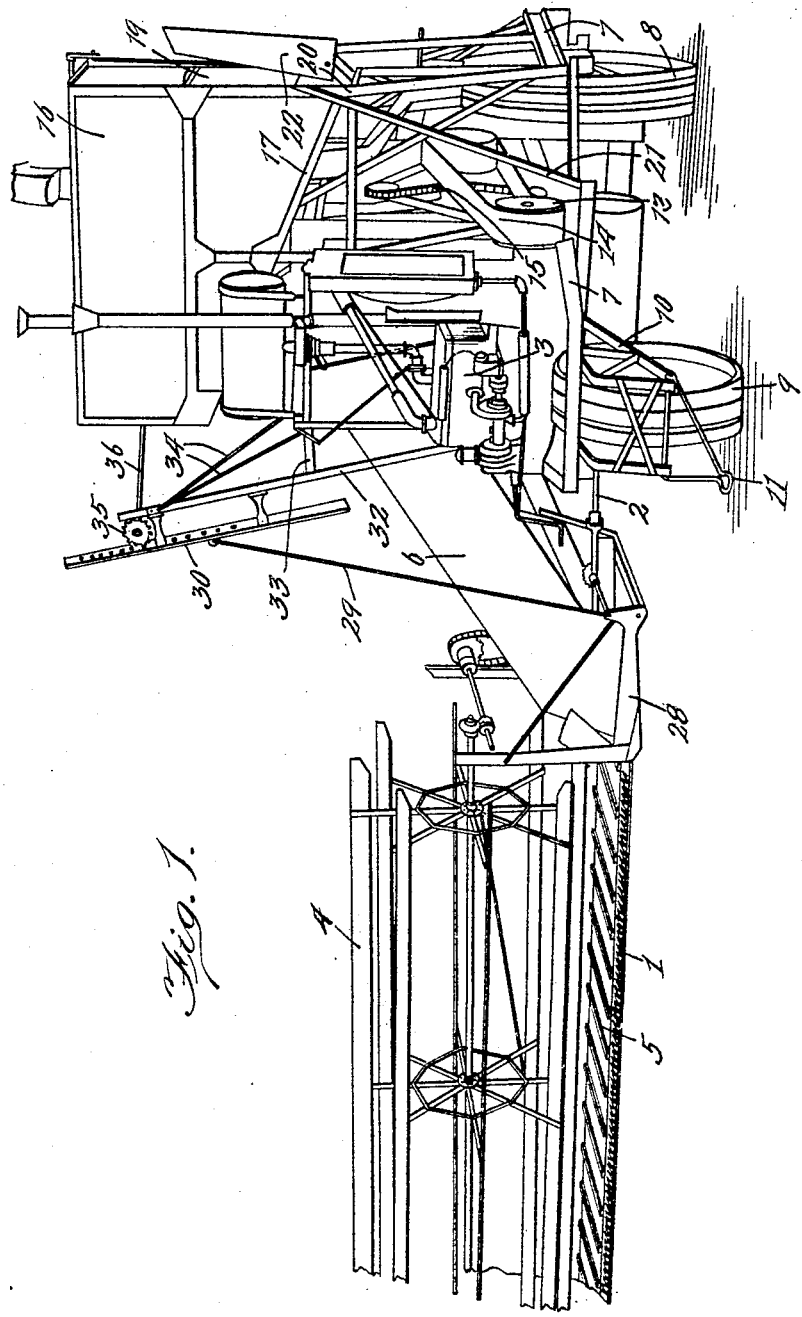

Patented Oct. 27, 1931

1,829,388

UNITED STATES PATENT OFFICE

JAMES T. ASHTON, OF BATTLE CREEK, MICHIGAN, ASSIGNOR, BY MESNE ASSIGNMENTS, TO OLIVER FARM EQUIPMENT COMPANY, OF WILMINGTON, DELAWARE, A CORPORATION OF DELAWARE

ONE MAN CONTROLLED COMBINED HARVESTER AND THRASHER

Application filed November 9, 1927. Serial No. 232,009.

The present invention relates to agricultural devices or machines, and more particularly to harvesters having means for separating the grain.

Among the objects of the invention is to provide novel means whereby all of the operating parts requiring inspection, adjustment, attention and control, may be effected by one operator so located that he may readily inspect, control, adjust and give attention to the various parts of the machine, without moving about on the machine. This is preferably made possible by providing a platform for the operator at a point or location where the operator standing on such platform, may easily and quickly see the various parts under operation, and also having immediate access to all of the controls and adjustments for the various parts, with the platform so associated with the controls and adjustments that they may be so easily accessible by the operator standing on the platform. By this arrangement, considerable saving in operating cost is effected, one man doing the work of several men heretofore required. With the platform located as herein disclosed, the operator may watch and manipulate every part of the entire machine, such as the cutting or heading mechanism, and the raising and lowering means therefor; the grain passing through and being collected in the bulk grain tank or receptacle to see if the same is being properly cleaned; the discharge of the grain from such receptacle into a wagon or cart drawn up along the side of the machine; the recleaning device and the screen or shoe thereof, as also the louvers under the same, and also the blower and its wind board for directing a stream of air through the recleaning device; the various elevating means for the grain, such as that for bringing the grain to the recleaning device, that for conveying the grain to the receptacle, and that for returning the tailings and the like to the thrashing cylinder; the driving means including the chains, belts and the like at the sides of the thrasher and connected between the thrasher and cutter or header; and the operating device including the motor and controls therefor, such as the ignition means together with the switch therefor, the clutch, the carburetor and the throttle thereof, the brakes, and the like. All of these may be effected without the operator changing his position. Moreover, by placing the operator at the vantage point mentioned, he is remote from the dust produced at certain parts of the machine, thus making his work pleasant.

Other objects, advantages, capabilities and features are comprehended by the invention as will later appear and are inherently possessed thereby.

Referring now to the drawings, Fig. 1 is a front view partly in perspective of a combined harvester and thrasher embodying the invention.

Fig. 2 is a rear perspective view of a part of the machine showing the platform and associated features embodying the invention.

Fig. 3 is a diagrammatic or schematic view of the various parts, showing the parts in separated or spread condition so as to make the relationships clearer.

Referring now more in detail to the drawings, the invention is shown as embodied in a combined harvester and thrasher, the same comprising a cutter or header fragmentarily shown at the left side of Fig. 1 of the drawings, and a separator or thrasher mechanism at the right hand side of said figure. The cutter or header comprises cutting means 1 adapted to be operated by way of driving mechanism 2 having driving connection with driven means from a motor 3 supported upon the frame of the separator or thrashing mechanism. As the plants are being cut, the heads thereof will be engaged by a reel 4 for aiding in depositing the cut plants upon an endless conveyor 5, adapted to deliver the cut grain to a conveyor in the conveyor mechanism leading to the thrashing means upon the thrashing mechanism.

The separator or thrashing mechanism is suitably supported by way of a frame 7 upon rear wheels 8 and a forward wheel 9, the forward end of the frame having a draft means 10 to which is flexibly connected a hitch element 11 adapted to be attached to a tractor which may draw the combined harvester and thrasher over the ground for the purposes disclosed. The motor or engine 3 is adapted to drive through a clutch 12 to a pulley 13 which in turn drives a belt 14 connected with driven means of the separator for operating the various parts thereof, such driven means including one or more chains 15 connected in suitable manner to the parts to be driven thereby.

Upon the frame 7 is mounted at an elevation a collecting receptacle or bulk grain tank 16 which may have an inclined bottom 17 leading to an opening 18 provided in a side wall 19 of the tank, this wall being on the stubble-ward side of the machine. The tank 16 may be supported by way of suitable uprights 20 and braces 21 fastened to the frame 7 in any suitable manner. To the side of the tank may be pivotally connected a chute 22 adapted to cooperate with the opening 18 to convey grain from the same to a cart or wagon that may be drawn up to the side of the thrasher when it is desired to receive and cart away the grain. The opening 18 is controlled by a slide gate 22 connected to a link 23 which is pivotally connected to a crank arm 24 secured to a rock shaft 25 rotatably supported in suitable bearings provided in the upper part of the tank 16. The rock shaft 25 has an arm 26 extending over the top of the tank 16 and rearwardly near a platform 27 upon which the operator stands when operating and controlling the machine.

The platform 27 is supported in any suitable manner at the rear and adjacent the tank 16 whereby the operator may be able to look into the tank 16 to inspect the quantity of the grain therein as well as its condition to determine whether or not it is properly cleaned. It will, of course, be understood that the platform 27 has suitable supporting elements connected to the frame of the thrasher.

To one end of the cutting mechanism is secured a forwardly extending arm 28 to the outer end of which is connected a link 29. The upper end of the link is pivotally connected to a slide rack bar 30 slidably mounted in brackets 31 carried on a post 32 supported upon a side of the frame 7 of the thrasher and braced by means of brace members 33 and 34 also connected to the thrasher structure. The rack bar 30 is operatively connected to a pinion 35 fastened to one end of an operating shaft 36, the other end of the operating shaft extending to a point near the platform 27 and carrying an operating wheel 38 which may be manually operated by the operator standing on the platform 27. It will be apparent that when the wheel 38 is turned, the rack 30 may be raised or lowered and hence the arm 28 which is rigid with the frame of the cutting mechanism or header, to raise or lower the same as desired. It will be also apparent that from the point where the operator stands on the platform 27 he may readily see the effect of the cutting of the cutting mechanism or header and also determine the proper height of adjustment of the same for the particular plants being cut.

The clutch mechanism 12 of the motor 3 may be operatively controlled through a crank arm 39 connected to a link 40 which is connected in turn to a crank arm 41 secured to a shaft 42 suitably rotatably mounted in stationary parts of the separating mechanism or machine. The inner end of the shaft 42 extends toward and is located near the platform 27 and carries an arm 43 for access by the operator standing on the platform 27.

Similarly, a motor 3 has a carburetor 44 having a throttle connected by a link 45 extending to and being pivotally connected to a crank arm 46 secured to a shaft 47, also suitably rotatably mounted in a fixed part of the machine. The inner end of the shaft 47 extends to and near the platform 27 and carries a handle 48 adapted to be manually operated by the operator on the platform 27. In a similar manner the brake mechanism and ignition means may be operated.

In an upper part of the thrashing machine is located a recleaning device 49 within which is included one or more screens or riddles 50 which may be pivotally supported at one end thereof from links 51 and 52, the upper ends of these links being connected to a fixed part of the machine, such as the side walls of the thrashing mechanism. The other end of the screen is pivotally supported from links 53 and 54 the upper ends of which are pivotally connected to crank arms 55 and 56 secured to a shaft 57 rotatably supported in any suitable bearing carried by a fixed part of the machine. One end of the shaft 57 carries a handle 58 located on the outside of the recleaning device 49 and close to the platform 27 so as to give easy access to the operator standing on that platform. The handle 58 preferably cooperates with a slotted arc 59 which may be connected to the side wall of the recleaning device or chamber 49, and carry means for securing the arm 58 in any adjusted position with reference to the arc 59. It will be apparent from the above that the operator may easily operate the handle 58 by turning around and reaching the same at the rear of the platform 27, such operation causing a raising or lowering of the rear end of the screen or riddle 50 so as to vary its position or inclination, as desired.

Below the screen or riddle 50 are also located a number of louvers or slats 60 having trunnions 61 at their ends rotatably supported in the side walls or the like of the thrashing machine. Each louver may have an eye or loop element 62 pivotally connected to a bar 63, the latter being pivotally connected to a bell crank 64 having pivots 65 suitably rotatably mounted in a fixed part of the machine. To the bell crank 64 may be pivotally connected an operating arm 66 extending through a slot 67 in a side wall 68 of the machine, the bar 66 being provided with teeth and notches 69 adapted to cooperate with the lower edge of the slot 67, for adjustable engagement of the bars at different points. The outer end of the bar may have a handle 70 as clearly shown in Fig. 3. This handle is located sufficiently near the platform 27 so that the operator by bending over the top of the recleaning device 49 may easily have access to such handle and move the same longitudinally to cause an angular swinging of the louvers 60 as desired, the teeth and notches 69 in the bar being engaged at the desired point with the lower edge of the slot 67 to determine the particular adjusted position.

In a recleaning device, it is usual to provide means for blowing a stream of air upwardly through the same, usually by a blower in the discharge mouth or spout of which is usually located a wind board 71. The latter, in the invention herein described, is pivotally mounted by connecting the board to a shaft 72 rotatably supported in any suitable manner in fixed parts of the machine, and extending outwardly beyond the side wall 68 where an arm 73 is secured. This arm has a thumb nut and pin device 74 cooperating with an arc slot 75 in the side wall 68, for locking the same in adjusted and swung position. It will also be seen from this that this arm is also located close to the platform 27 so that the operator may bend over and reach the same and move the arm in any adjusted position with reference to the arc slot 75 and hence vary the angular position of the wind board 71 so as to direct the stream of air upwardly at any desired angle, through the screen 50.

When thrashing grain, the thrashed grain proceeding from the thrashing cylinder passes through several mechanisms and is brought by means of an elevator to the recleaning device 49. The elevator is usually of an endless conveyor type having chains passing over sprockets, of which the upper sprocket operates upon a shaft 77 extending through slotted side plates 78 fastened to the sides of the upper end of the conveyor housing 76. The ends of the shaft 77 are supported in links 79, the upper ends of which are threaded and passed through an apertured plate 80 supported upon the upper end of the elevator housing 76. Nuts 81 or the like may be engaged with the threaded ends of the links 79 to raise or lower the same, and thus raise and lower the shaft and sprocket so as to give a greater or less tautness to the chains of the conveyor. It will be noted that the upper end of the housing 76 is also opened so that the operator may see the condition of the grain passing therethrough. The grain will then pass through a spout 82 into the recleaning device 49. From this it will be apparent that by reason of locating the upper end of this elevator close to the platform 27, the operator may easily inspect the interior thereof as well as adjust the nuts 81 so as to cause a greater or less tension in the chain and eliminate looseness or slack.

The operation of the recleaning device, in part, is to remove certain incompletely thrashed or separated grain, which is usually termed tailings. The same may be removed from the recleaning device and then conveyed through a suitable conveyor or elevator means 83 shown in Fig. 3 at the right hand side of the platform 27, this conveyor or elevator discharging through a spout 84 leading back to the thrashing cylinder, so that the tailings will be again operated upon by the thrashing cylinder to remove the grain. The upper end of this elevator 83 is constructed similarly to that above described for elevating the material to the recleaning device, and further detailed description will not be necessary. It has at its upper end an adjusting device for adjusting the upper sprocket shaft of the chain therein. It is located close to the platform 27 so as to be readily accessible to the operator for inspection and adjustment of the nuts on the links for adjusting the chain.

The cleaned grain from the recleaning device passes from the same and is raised by an elevator 85, the upper end of which extends over the top of the tank 16 and has a chute 17 for discharging the grain into the tank 16. The upper end of this elevator is constructed the same as the upper end of the elevator 76 and has adjusting means for raising and lowering the shaft and sprocket over which the chain of the elevator passes. Further detailing is unnecessary. It will be observed that the upper end of this chute is of similar construction and is located sufficiently near the platform 27 so that the operator may bend over and inspect the interior of the same as well as reach the nuts on the links thereof for adjusting the tautness of the chain within the elevator construction. In other words, these various elevators are located sufficiently near the platform 27 so that the operator may readily inspect the operation thereof as well as make the desired adjustments.

On the rear wall of the tank 16 may be provided a suitable board or the like for including instruments indicating the condition and operation of the motor and operating mechanism. As for example, it may have an ignition switch 86, which is immediately accessible to the operator standing on the platform 27. This ignition switch may be connected in its usual manner with the ignition device of the motor 3.

From the above it will be apparent that this invention provides for a very convenient arrangement whereby all of the controls of the whole mechanism may be operated from a single point, namely at the location where the operator stands upon the platform 27.

At the same time the disposition of the platform and the parts of the machine are such that the operator may easily inspect the operation thereof and the various adjustments made by him.

While I have herein described and upon the drawings shown an embodiment of the invention, it is to be understood that the latter is not limited thereto but may comprehend other constructions, arrangements of parts, details and features without departing from the spirit thereof.

Having thus disclosed the invention, I claim:

1. In a combined harvester having a thrashing means, means including a receptacle for receiving thrashed material, a platform adjacent said receptacle and so located that the operator standing on said platform may readily inspect the contents in the receptacle and operate means for controlling the discharge of the contents from said receptacle, and means for controlling said discharge.

2. In a combined harvester having a thrashing means, means including a receptacle for receiving thrashed material, said receptacle being in elevated position, means for conveying the thrashed material into said receptacle, an elevated platform adjacent said receptacle and so located that the operator standing on said platform may readily inspect the contents in the receptacle and operate means for controlling the discharge of the contents from said receptacle, and means for controlling said discharge.

3. In a combined harvester having cutting and separating means, an elevated platform on said separating means, means connected to said cutting means and extending to said platform whereby control of said cutting mechanism may be had from said platform and whereby visibility of said cutting mechanism and said separating means may be had from said platform.

4. In a combined harvester having cutting and separating means, an elevated platform on said separating means, and so located that the operator thereon has free vision of the cutting and separating means and the operation thereof, raising and lowering means connected to said cutting means and extending to said platform for ready access to and for facile operation by the operator in said platform.

5. In a combined harvester having cutting means and separating means, a grain tank in elevated position on said separating means, and having a discharge opening in a wall of said tank on the stubble-ward side thereof, a platform in elevated position on said separating means and adjacently at the rear of said tank whereby the operator on said platform may have a view of and access to the contents of the tank, and means including a gate for controlling said discharge opening and gate operating means extending to said platform for ready access to and facile operation of said operating means by said operator on said platform.

6. In a combined harvester having a cutter and separator, a motor on said harvester and connected to the cutter and separator for operating the same, an elevated platform on said separator so located that the operator thereof may have view of and access to the operating mechanism and control therefor, and control means for said motor and extending to said platform for easy access thereby and facile operation thereof by said operator when on said platform.

7. In a combined harvester having a cutter and a separator, a motor on said harvester, said motor having a clutch, ignition means, throttle means and brakes, controls for said cutter, separator, clutch, ignition means and throttle means, and a platform in elevated position on said separator, said controls extending to said platform for easy access thereto and facile operation thereof by an operator standing on said platform.

8. In a combined harvester having a separating means, a thrashed grain recleaning device in said separating means and having a movable screen, means for adjusting the position of said screen, and a platform on the separating means and located near said recleaning device to give ready access to said adjusting means by the operator standing on said platform.

9. In a combined harvester having a separating means, a thrashed grain recleaning device in said separating means and having a screen, louvers associated with said screen, means for adjusting the angle of said louvers, and a platform on the separating means and located near said recleaning device to give ready access to said adjusting means by the operator standing on said platform.

10. In a combined harvester having a separating means, a recleaning device for the separated grain and having a movable screen, louvers associated with said screen, a platform on said separating means and located near said recleaning device, and means for adjusting the position of said screen and the angle of said louvers and located near said platform to be readily accessible to the operator on said platform.

11. In a combined harvester having separating means for separating grain, means for elevating the separated and partly separated grain to given points of the separator for treatment thereof, said elevating means having chains passing over sprockets, means for adjusting the chains for tightening the same, and a platform located near said adjusting means to provide ready access to the adjusting means by the operator on said platform.

12. In a combined harvester comprising a thrashing device having means for recleaning thrashed and partly thrashed grain, means for returning tailings and incompletely thrashed grain to the thrashing device, and means for receiving and collecting thrashed and cleaned grain, elevators for conveying the material to the recleaning, thrashing and collecting means and having conveyor chains, means for adjusting the tautness of said chains, a platform located near said elevators and said adjusting means whereby the operator on said platform may have easy access to said adjusting means for operating the same.

13. In a combined harvester comprising thrashing means having a recleaning device for thrashed and incompletely thrashed grain, means for directing a stream of air through said device and comprising a wind board for varying the direction of the stream, means for adjusting the angle of said wind board, and a platform on said thrashing means and located near said recleaning device and said adjusting means for providing ready access to said adjusting means by the operator on said platform.

14. In a combined harvester comprising thrashing means having a recleaning device for thrashed and incompletely thrashed grain, a movable screen in said recleaning device, louvers associated with said screen, means for directing a stream of air through said device and comprising a wind board for varying the direction of the stream, a platform on said separating means and located near said recleaning device, and means for adjusting the position of said screen, the angle of said louvers and the angle of said wind board, and a platform on said thrashing means and located near said recleaning device and said adjusting means for providing ready access to said adjusting means by the operator on said platform.

In witness whereof, I hereunto subscribe my name to this specification.

JAMES T. ASHTON.